(12) United States Patent
Singer

(10) Patent No.: US 11,377,212 B2
(45) Date of Patent: Jul. 5, 2022

(54) UNMANNED AIRCRAFT FOR SAFE AERIAL LIFTING

(71) Applicant: Samia A. Singer, Newton, MA (US)

(72) Inventor: Samia A. Singer, Newton, MA (US)

( * ) Notice: Subject to any disclaimer, the term of this patent is extended or adjusted under 35 U.S.C. 154(b) by 385 days.

(21) Appl. No.: 16/784,780

(22) Filed: Feb. 7, 2020

(65) Prior Publication Data
US 2020/0255148 A1 Aug. 13, 2020

Related U.S. Application Data

(60) Provisional application No. 62/803,441, filed on Feb. 9, 2019.

(51) Int. Cl.
*B64D 9/00* (2006.01)
*B64C 39/02* (2006.01)

(52) U.S. Cl.
CPC .............. *B64D 9/00* (2013.01); *B64C 39/024* (2013.01); *B64C 2201/027* (2013.01); *B64C 2201/108* (2013.01)

(58) Field of Classification Search
CPC .......... B64D 9/00; B64D 1/22; B64D 17/383; B64C 39/024; B64C 39/02; B64C 2201/027; B64C 2201/108; B64C 2201/128; H01F 7/06
See application file for complete search history.

(56) References Cited

U.S. PATENT DOCUMENTS

| | | | | |
|---|---|---|---|---|
| 2,489,864 A * | 11/1949 | Cravener | ................ | B66C 1/66 294/82.35 |
| 2,734,697 A * | 2/1956 | Brow | ................ | B64D 3/00 244/3 |
| 3,012,811 A * | 12/1961 | Sandrock | ................ | G21C 19/105 976/DIG. 251 |
| 3,174,790 A * | 3/1965 | Bendl | ................ | B64D 1/22 74/89.37 |
| 3,485,151 A * | 12/1969 | Taylor | ................ | B64D 47/08 244/137.4 |
| 3,601,342 A * | 8/1971 | Piasecki | ................ | B64D 1/22 212/230 |
| 3,666,216 A * | 5/1972 | Nagy | ................ | B63G 8/42 244/172.4 |
| 3,976,937 A * | 8/1976 | Hearn | ................ | G01V 3/165 324/331 |
| 4,225,171 A * | 9/1980 | Hay, II | ................ | B66C 1/06 294/65.5 |
| 4,264,098 A * | 4/1981 | Haake | ................ | B66C 1/38 294/82.35 |
| 5,688,012 A * | 11/1997 | Siesjo | ................ | B66C 1/66 294/82.32 |
| 5,836,548 A * | 11/1998 | Dietz | ................ | B64D 1/08 294/82.26 |
| 7,648,183 B2 * | 1/2010 | Cornwell | ................ | B66C 1/62 294/90 |
| 8,493,068 B2 * | 7/2013 | Morrison | ................ | B64D 3/00 324/330 |

(Continued)

Primary Examiner — Medhat Badawi
(74) Attorney, Agent, or Firm — Wolf, Greenfield & Sacks, P.C.

(57) ABSTRACT

Embodiments described herein relate to arrangements in which unmanned aerial vehicle (UAVs) are adapted to retrieve or carry a payload without becoming caught or snagged, e.g., on a tree or building. Such arrangements may help to prevent accidents or loss of the UAV.

17 Claims, 2 Drawing Sheets

(56) References Cited

U.S. PATENT DOCUMENTS

| | | | |
|---|---|---|---|
| 9,016,617 B2* | 4/2015 | Wang | B64C 27/54 |
| | | | 324/331 |
| 9,321,531 B1* | 4/2016 | Takayama | B64D 1/02 |
| 9,580,173 B1* | 2/2017 | Burgess | B64D 1/22 |
| 10,301,021 B2* | 5/2019 | Jones | B64C 39/024 |
| 2013/0054054 A1* | 2/2013 | Tollenaere | G05D 1/0858 |
| | | | 701/3 |
| 2014/0363267 A1* | 12/2014 | Kulesha | B64D 9/00 |
| | | | 414/812 |
| 2016/0059963 A1* | 3/2016 | Burgess | B64D 9/00 |
| | | | 701/49 |
| 2017/0009937 A1* | 1/2017 | Shin | B66D 1/36 |
| 2019/0233254 A1* | 8/2019 | Shin | H01F 7/06 |
| 2020/0255148 A1* | 8/2020 | Singer | B64D 1/22 |

* cited by examiner

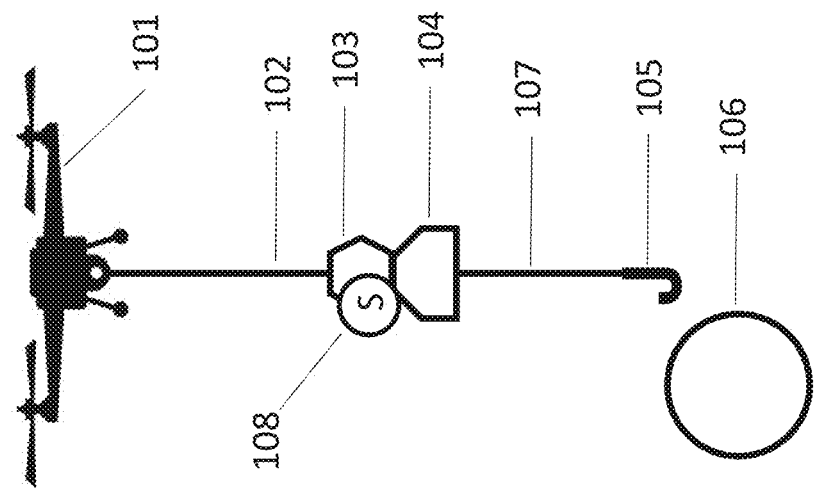
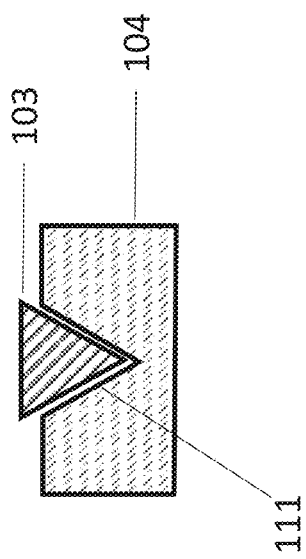
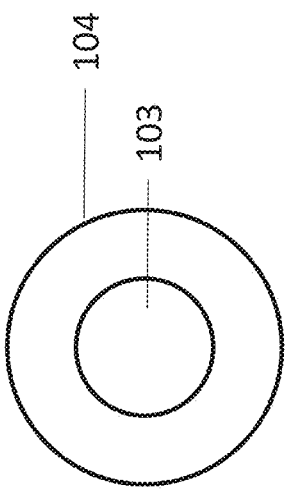

UNMANNED AIRCRAFT FOR SAFE AERIAL LIFTING

CROSS REFERENCE TO RELATED APPLICATION

This application claims the benefit of U.S. Provisional Application No. 62/803,441, filed Feb. 9, 2019, which is hereby incorporated by reference in its entirety.

FIELD

Aspects herein relate generally to the field of unmanned aerial vehicles (UAVs), also called "drones". More specifically, aspects herein relate to arrangements in which UAVs are adapted to retrieve or carry a payload at low altitude without becoming caught or snagged, e.g., on a tree or building. Such arrangements may help to prevent accidents or loss of the UAV.

BACKGROUND

An unmanned aerial vehicle (UAV) is an aircraft that is not controlled by a human onboard the aircraft. A UAV can be a rotary wing aircraft, e.g. a rotorcraft, or a fixed-wing aircraft. A UAV rotorcraft can be a multirotor UAV. A multirotor UAV can comprise, e.g., four, six, eight or more rotors. Typically, a multirotor UAV is capable of stationary flight and vertical take-off and landing (VTOL). These capabilities make a multirotor UAV useful for retrieving or carrying an object that is not an integral part of the UAV, i.e., a payload. The small size and VTOL capabilities of some multirotor UAVs allow them to operate in areas inaccessible to other aircraft, e.g., due to terrain, including buildings, trees, or other obstacles. These features make a multirotor UAV useful for retrieving an object that is otherwise difficult for a human or a manned aircraft to reach. The payload can be suspended from the UAV, e.g., by a cable.

SUMMARY

Aspects herein are directed to a multirotor UAV equipped with a reliable and inexpensive means to release a suspended payload or its means of suspension from the UAV when the UAV becomes caught or snagged. Aspects herein also provide a means to preserve aerodynamic stability of the UAV if the payload (or the payload's means of suspension) is released.

The means for releasing is provided by a coupling that is interposed between the UAV and the payload. The coupling can be, for example, magnetic or mechanical, for example, with a latch or adhesive.

In some embodiments, a magnetic coupling may comprise two coupling parts: a first permanent magnet and a counterpart that is a ferromagnetic counterpart, a paramagnetic counterpart, or a second permanent magnet. The two coupling parts are releasably attached by a magnetic force between them that is selected to be more than the weight of the payload but less than maximal net lift of the UAV.

Both latches and adhesives can be configured or selected to provide a desired holding force. The holding force can be static or variable. A latch of variable holding force can be achieved, for example, by use of a spring of variable tension.

In an exemplary embodiment, one coupling part is suspended from the UAV by means of a connector, e.g., a cable; and the payload is suspended from the other coupling part by means of a hook. The size, shape, material, and magnetic field strength (where applicable) of the two coupling parts are selected such that the maximal holding force between them, i.e., with the coupling parts optimally attached (as defined herein), is less than the maximal net lift of the UAV and greater than the expected weight of the payload (plus certain parts of the apparatus, as disclosed herein). Thus constructed, the UAV can carry the payload but will separate from it if the payload is caught or snagged and sufficient lift is applied to the UAV causing separation of the two coupling parts.

Because they are reliable and inexpensive, some arrangements described herein may be particularly useful for consumer, small business, and light duty UAVs. The arrangements may find use indoors or outdoors. The arrangements can be useful, e.g., in connection with picking up or moving items or debris from a roof, gutters, yard, garden, patio, pool, or the interior of a home, office, store, warehouse, or other building; walking or leading a pet or other domestic animal; playing sports, including picking up balls (e.g., tennis or golf balls); retrieving samples (e.g., soil or plant samples); and performing household tasks. Some arrangements may be especially useful in a densely forested or dense urban environment, or around monuments and towers, where a UAV could become readily snagged.

According to some embodiments, an aerial device for lifting a payload is provided. The device includes a payload, a multirotor unmanned aerial vehicle (UAV), and a magnetic coupling comprising two coupling parts. At least one of the two coupling parts comprises a first permanent magnet. The other of the two coupling parts comprises a ferromagnetic counterpart or a second permanent magnet. The first coupling part is configured to releasably attach to the second coupling part by magnetic force. The first coupling part is attached to the UAV, the second coupling part is attached to a hook, and the hook is configured to attach to the payload. The magnetic force between the first coupling part and the second coupling part is less than the maximal net lift of the unmanned aerial vehicle, and greater than the aggregate weight of the payload, the second coupling part, and the hook.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

DESCRIPTION OF THE DRAWINGS

FIG. 2A is a cross-sectional view of a magnetic coupling according to one embodiment.

FIG. 2B is a top view of the magnetic coupling of FIG. 2A.

FIG. 3 is a schematic drawing of a UAV arrangement according to one embodiment, the arrangement having a switch for detecting separation of first and second coupling parts.

DETAILED DESCRIPTION

Figure 1C:
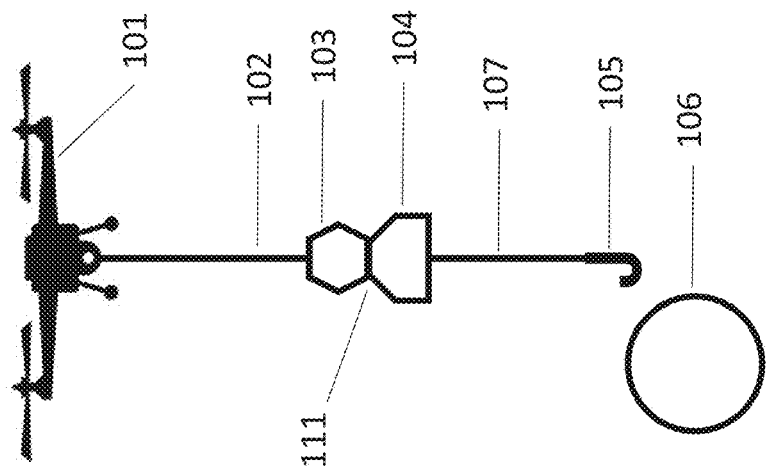
FIG. 1C is a schematic drawing of an alternative embodiment of a UAV arrangement that includes a hook suspension line interposed between the coupling and the hook.

The inventor has recognized that, when used to retrieve or carry an object, a multirotor UAV suffers from a crucial disadvantage. If a payload, hook, or cable becomes caught or snagged on a tree, building, or any other object that is immovable or too heavy for the UAV to lift, the UAV is prone to crash. The risk of such catching or snagging is increased by certain inherent characteristics of a UAV, namely, the inability to intervene from aboard the aircraft, and less situational awareness than afforded by a manned aircraft. A crash can pose significant hazards to people and property, including loss of the UAV. The UAV can also be irretrievably lost.

The serious consequences of catching or snagging can be avoided by equipping the UAV with a means for separating from the payload (or the payload's means of suspension from the UAV), such that the UAV can fly away without a crash or loss of the UAV.

Aspects herein relate to a multirotor UAV equipped with a reliable and inexpensive means to release a payload quickly and potentially automatically if the payload (or its means of suspension from the UAV) becomes caught, snagged, or stuck to an object that is immovable or too heavy for the UAV to lift. In some embodiments, the means to free the UAV does not consume power, depend on remote control, or add substantial weight to the UAV.

Multirotor UAVs are known in the art and described, e.g., in U.S. Pat. No. 9,016,617. Definitions As used herein, "terrain" refers to the earth and any natural or artificial object substantially attached to the earth.

As used herein, "connector" refers to an optional part that is interposed between the UAV and the magnetic coupling whereby, when the payload is suspended in the air from the UAV, the connector, among other parts of the apparatus, bears the entire weight of the payload. A connector can be, for example, a cable. A connector can be flexible or rigid. A connector can be of any suitable material and construction, provided it is of sufficient tensile strength to bear the weight of the payload.

As used herein, "holding force" refers to a force that tends to keep two coupling parts attached, the scalar of which equals the scalar of the force necessary to detach the two coupling parts, where the direction of such detaching force is substantially plumb with reference to the ground.

As used herein, "hook" refers to any device adapted to suspend or attach releasably to a payload such that the payload can be lifted or moved. A hook can be, for example, mechanical, magnetic, or adhesive and can include a traditional hook or a latch.

As used herein, "hook suspension line" refers to an optional part that is interposed between the magnetic coupling and the hook whereby, when the payload is suspended in the air from the UAV, the hook suspension line, among other parts of the apparatus, bears the entire weight of the payload. A hook suspension line can be, for example, a cable. A hook suspension line can be flexible or rigid. A hook suspension line can be of any suitable material and construction, provided it is of sufficient tensile strength to bear the weight of the payload.

As used herein, "proximal" refers to a part or portion of a part, e.g., a connector, that is closer to the UAV. As used herein, "distal" refers to a part or portion of a part, e.g., a connector, that is farther from the UAV.

As used herein, "net lift" refers to a measure of force that is the excess of the UAV's aerodynamic lift over the gravitational force exerted on the UAV, wherein the weight of the UAV includes the weight of the first coupling part and an optional connector, as disclosed herein. "Maximal net lift" refers to the net lift obtained when the UAV is configured to obtain maximal aerodynamic lift, e.g., by application of maximum power to the rotors. The skilled person will know that in practice the maximal aerodynamic lift can vary, for example, based on the status of the battery. Thus, for purposes of this disclosure, maximal aerodynamic lift means the maximal aerodynamic lift that can be reliably obtained during normal operation of the UAV.

As used herein with respect to the magnetic coupling, "optimally attached" refers to a spatial arrangement and orientation of the first coupling part and second coupling part that provides for the greatest attractive magnetic force between the coupling parts.

Throughout this disclosure, unless otherwise clear from the context, "magnetic force" refers to the magnetic force of the optimally attached magnetic coupling, also referred to herein as "maximal magnetic force".

As used herein, "payload" means an object or objects to be lifted or moved by the UAV that are not themselves a part of the UAV or the lifting apparatus described herein. Payload can include, as non-limiting examples: cameras, sensors, scientific instruments, mechanical or electrical parts, construction materials, tools, crops, medicines, chemical agents (e.g., fire retardants, pesticides, herbicides, fungicides), toys, animals, and humans.

Throughout this disclosure, "substantially plumb" refers to the "direction of suspension". The direction of suspension is defined by two points that are: (1) the UAV attachment point and (2) the payload attachment point. The UAV attachment point is the point where the UAV attaches to the first coupling part or optional connector, as described below. The payload attachment point is the point where the payload attaches to the hook, as described below. Where a stationary payload is suspended aloft by a stationary, aloft UAV in the absence of wind, "substantially plumb" will be essentially vertical, i.e., oriented toward the center of the earth. Various forces can alter this essentially vertical orientation, for example: (1) the relative wind as a consequence of UAV flight; (2) actual wind; and (3) differences between payload inertia and UAV inertia in the context of any horizontal acceleration (or deceleration) of the UAV. For purposes of this disclosure, "substantially plumb" includes not only vertical or essentially vertical, but also the deviations from essentially vertical causes by the aforementioned forces.

Design and Operation

Figure 1B:
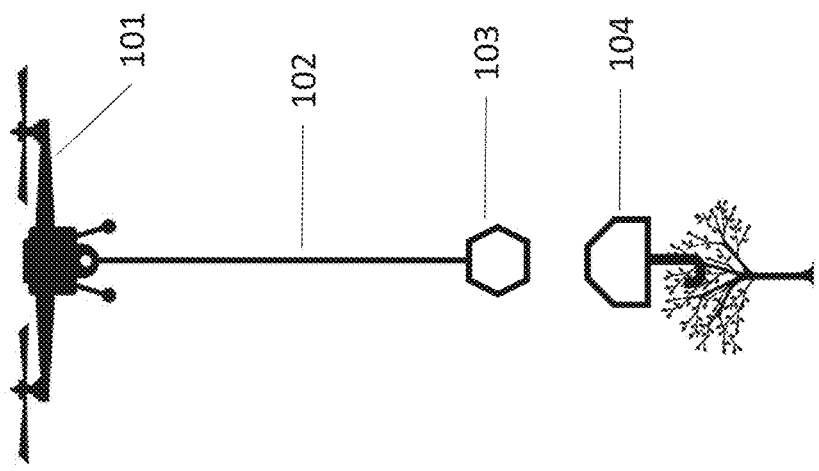
FIG. 1B is a schematic drawing of the UAV arrangement of FIG. 1A, where the hook is stuck on a tree and first and second coupling parts of the coupling have separated to disconnect the hook from the UAV.
Figure 1A:
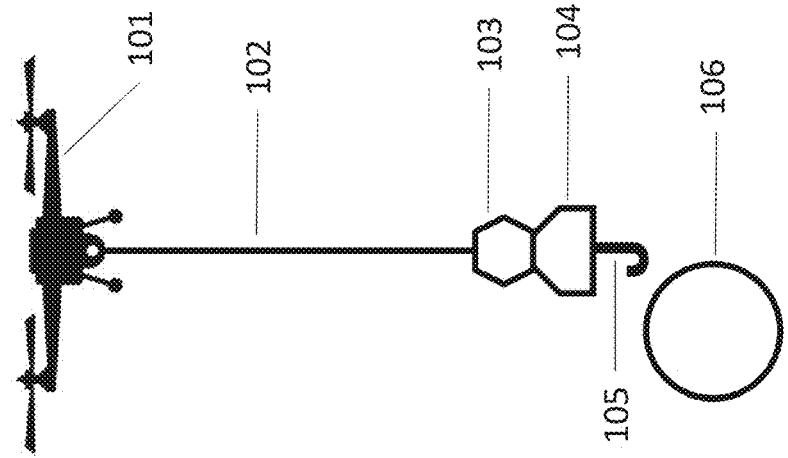
FIG. 1A is a schematic drawing of a UAV arrangement according to one embodiment, where the arrangement includes a hook for retrieving a payload, and includes a coupling that connects the hook to the UAV.

FIG. 1A depicts one embodiment, which is an aerial device comprising a multirotor UAV 101, an optional connector 102, a coupling comprising a first coupling part 103 and a second coupling part 104, and a hook 105. UAV 101 is attached to the proximal end of connector 102. The distal end of connector 102 is attached to first coupling part 103. First coupling part 103 comprises a permanent magnet. Second coupling part 104 comprises a ferromagnetic counterpart. First coupling part 103 is releasably attached to second coupling 104 only by an attractive magnetic force of fixed and known amplitude. Second coupling part 104 is attached to a hook 105, which is adapted to lift a payload 106.

In some embodiments, the permanent magnet and the ferromagnetic counterpart are selected such that, when they are optimally attached, the attractive magnetic force between them is: (1) less than the maximal net lift of the UAV under normal operating conditions; and (2) greater than the weight of the payload (plus other parts of the apparatus that are distal to the first coupling part). By this design, the aerial device can carry the payload; however, if the payload 106 or hook 105 becomes caught or snagged on terrain, application of maximal net lift to the UAV will cause separation of first coupling part 103 from second coupling part 104, thereby freeing UAV 101.

In some embodiments, first coupling part 103 from second coupling part 104 are configured such that application of a net lift that is less than the maximal net lift is sufficient to separate them, provided that such net lift exceeds the aggregate weight of the payload, the hook, the second coupling part, and any other part of the apparatus that is distal to the first coupling part, e.g. a hook suspension line as disclosed herein.

The skilled artisan will understand that in practice, wind or acceleration of the UAV in any of several directions, e.g., horizontally, combined with inertia of the payload 106, could apply a force in a direction that could cause the first coupling 103 to slide with respect to the second coupling 104, i.e, to move in a direction that is not strictly parallel to the attractive magnetic force between the couplings. In an extreme situation, such sliding could separate first coupling part 103 from second coupling part 104. At least three solutions are available to counteract this problem. Appropriate limits can be place on horizonal acceleration of the UAV; however, this may be undesirable. Appropriate safety margins can be incorporated in the maximal magnetic force of the magnetic coupling. In some embodiments, the problem can be addressed by use of a non-flat coupling interface, as further described herein.

Multirotor UAV 101 can be any suitable UAV, e.g., one of U.S. Pat. No. 9,016,917.

Connector 102 can be any suitable flexible or rigid material. Exemplary connectors include cables, wires, bars, and the like.

A permanent magnet can be made from any suitable magnetizable material, e.g., neodymium, samarium cobalt, Alnico alloy, or strontium ferrite. The permanent magnet can be encased or coated, e.g., with plastic, to protect it from damage.

A ferromagnetic counterpart can be made from any suitable ferromagnetic material, e.g., iron. The permanent magnet can be encased or coated, e.g., with plastic, to protect it from damage.

In some embodiments, first coupling part 103 and second coupling part 104 can be interchanged. For example, first coupling part 103 can comprise a ferromagnetic counterpart and second coupling part 104 can comprise a permanent magnet. The essential relationship between first coupling part 103 and second coupling part 104 is that they can be releasably attached by an attractive magnetic force of predetermined magnitude.

In some embodiments, first coupling part 103 and second coupling part 104 comprises a permanent magnet, and the magnets are oriented such that the coupling parts can be releasably attached by an attractive magnetic force between the magnets.

In some embodiments, the coupling part is a latch whereby first coupling part 103 attaches mechanically to second coupling part 104. In some embodiments, the latch has a fixed holding force. In some embodiments, the latch has a variable holding force. In some embodiments, the holding force of the latch can be varied remotely by a user, for example, by a remote-controlled servo motor connected to a spring on the latch, whereby movement of the servo motor alters the spring force and thereby the holding force of the latch.

In some embodiments, the holding force is less than 75 percent of the maximal net lift of the unmanned aerial vehicle. In some embodiments, the holding force is less than 50 percent of the maximal net lift of the unmanned aerial vehicle.

In some embodiments, the holding force is more than 150 percent of the weight of the payload. In some embodiments, the holding force is more than 200 percent of the weight of the payload.

In some embodiments, the holding force is less than 75 percent of the maximal net lift of the unmanned aerial vehicle and more than 150 percent of the weight of the payload. In some embodiments, the holding force is less than 75 percent of the maximal net lift of the unmanned aerial vehicle and more than 200 percent of the weight of the payload. In some embodiments, the holding force is less than 50 percent of the maximal net lift of the unmanned aerial vehicle and more than 150 percent of the weight of the payload. In some embodiments, the holding force is less than 50 percent of the maximal net lift of the unmanned aerial vehicle and more than 200 percent of the weight of the payload.

In some embodiments, the magnitude of the optimally attached magnetic force is less than 75 percent of the maximal net lift of the unmanned aerial vehicle. In some embodiments, the magnitude of said magnetic force is less than 50 percent of the maximal net lift of the unmanned aerial vehicle.

In some embodiments, the magnitude of the optimally attached magnetic force is more than 150 percent of the weight of the payload. In some embodiments, the magnitude of said magnetic force is more than 200 percent of the weight of the payload.

In some embodiments, the magnitude of the optimally attached magnetic force is less than 75 percent of the maximal net lift of the unmanned aerial vehicle and more than 150 percent of the weight of the payload. In some embodiments, the magnitude of said magnetic force is less than 75 percent of the maximal net lift of the unmanned aerial vehicle and more than 200 percent of the weight of the payload. In some embodiments, the magnitude of said magnetic force is less than 50 percent of the maximal net lift of the unmanned aerial vehicle and more than 150 percent of the weight of the payload. In some embodiments, the magnitude of said magnetic force is less than 50 percent of the maximal net lift of the unmanned aerial vehicle and more than 200 percent of the weight of the payload.

First coupling part 103 and second coupling part 104 can be shaped such that when optimally attached, the interface 111 between them is flat. Alternatively, the coupling parts can be shaped such that, when the coupling parts are optimally attached, the relative movement between them is substantially restricted to the direction of suspension, or, in the case of a magnetic coupling, the magnetic axis of the first permanent magnet. This can be accomplished by use of an interface between that coupling parts that is not flat, e.g., a surface that includes two or more features selected from the group consisting of: an angled surface, a protrusion, or a depression, including, for example, a male protrusion and female depression or collar. For example, in one embodiment, first coupling part 103 is of protruding conical shape, and second coupling part 104 is recessed in a manner that is complementary to the conical shape of first coupling part 103 (FIG. 2A, cross-sectional view; FIG. 2B, top view). Accordingly, the interface 111 between the first coupling part 103 and the second coupling part 104 is conical. In some embodiments that comprise a magnetic coupling, the aerial device may be configured such that, when the magnetic coupling is suspended in the air, the magnetic axis of the first permanent magnet is oriented substantially plumb to the ground. In some further embodiments, the aerial device is configured such that relative movement between the coupling parts is substantially restricted in all axes except the direction of suspension, or the axis that is substantially plumb to the ground.

The hook 105 can be of any suitable design to enable suspension of payload 106. Exemplary hooks include hooks, loops, carabiners, bolts, pins, adhesives, or magnets.

FIG. 1B shows the result of operation of the UAV arrangement if hook 105 becomes accidentally stuck on a tree. Application of maximal lift to the UAV, e.g., by a remote operation of a human operator, causes first coupling part 103 to separate from second coupling part 104, thereby freeing UAV 101, connector 102, and first coupling part 103 from the tree and averting an accident. Application of maximal lift is not necessarily needed to separate first coupling part 103 from second coupling part 104; it is merely necessary that the net lift of the UAV exceed the attractive magnetic force between first coupling part 103 and second coupling part 104.

FIG. 1C shows an alternative embodiment, wherein a hook suspension line 107 is interposed between second coupling part 104 and hook 105. Hook suspension line 107 can be any suitable flexible or rigid material. Exemplary connectors include cables, wires, bars, and the like. An advantage of hook suspension line 107 is that, in the case of a magnetic coupling, a magnet contained in the magnetic coupling need not be in spatial proximity with the hook 105 or payload 106; this is important if either of hook 105, payload 106, or an object near any of them is magnetic, ferromagnetic, or susceptible to damage by a magnetic field.

In some further embodiments, the inventive UAV includes a means to detect if the coupling has separated. The means can include, for example, a switch 108 (FIG. 3) configured to detect the separation of first coupling part 103 from second coupling part 104. The switch can be, for example, a mechanical, electrical, magnetic, or optical contact switch. The switch 108 may be attached to first coupling part 103 and may provide electronic input to the UAV 101, for example, by means of two or more conductors from first coupling part 103, optionally passing along or within the optional connector 102, to UAV 101. For example, in one embodiment, the optional connector 102 is a coaxial cable comprising a weight-bearing braided nylon sheath surrounding a core of two separately insulated braided copper conductors; the connector 102 is interposed between the UAV 101 and the first coupling part 103 such that the nylon sheath bears the weight of the payload and not the copper conductors; and the copper conductors are connected at one end to the switch 108 and at the other end to circuitry within the UAV 101. In some embodiments, the inventive UAV is configured to remain stationary if the coupling has separated. Means to keep the UAV stationary include, for example, use of Global Positioning System (GPS) technology integrated with the UAV, or an accelerometer or gyroscope. Alternatively, the UAV may simply reduce thrust to the amount used immediately before the thrust was increased to maximal thrust. See Example 3. This may be useful, for example, to prevent or produce sudden recoil and/or loss of control of UAV 101 when the coupling separates. This recoil can occur, for example, when the force that counteracts that of the UAV 101 along the axis of the magnetic coupling (e.g., due a snagged payload or cable) is abruptly relieved, leaving the force (i.e., aerodynamic force, thrust) of the UAV 101 unopposed.

Further provided are systems or aerial lifting devices comprising a payload. The payload is lifted and/or suspended by the UAV as described in the figures and the examples. In some embodiments, the mass of the payload is between 1 g and 100 g, 100 g and 250 g, 250 g and 500 g, 500 g and 1 kg, 1 kg and 2 kg, 2 kg and 3 kg, 3 kg and 5 kg, 5 kg and 10 kg, 10 kg and 25 kg, 25 kg and 50 kg, 50 kg and 100 kg, 100 kg and 250 kg, 250 kg and 500 kg, or 500 kg and 1000 kg.

Thus, without limiting the foregoing description of aspects of the invention, certain embodiments can use the following relationships among the weight of the payload, the holding force of the coupling, and the maximal net lift of the UAV:

| Payload Mass (kg)/ Weight at Rest (N) | Coupling Holding Force (N) | Maximal Net Lift (N) |
| --- | --- | --- |
| 0.1 kg/0.98N | 1.5 | 2 |
| 0.1 kg/0.98N | 2 | 3 |
| 0.1 kg/0.98N | 5 | 6 |
| 1 kg/9.8N | 15 | 20 |
| 1 kg/9.8N | 20 | 30 |
| 1 kg/9.8N | 50 | 60 |
| 10 kg/98N | 150 | 200 |
| 10 kg/98N | 200 | 300 |
| 10 kg/98N | 500 | 600 |

EXAMPLES

Example 1

An inventive aerial lifting device was made according to the design of FIG. 1C, wherein the multirotor UAV was a YUNEEC® TYPHOON® UAV, the connector was a nylon cord, the first coupling part comprised a first neodymium magnet, the second coupling part comprised a ferromagnetic part, the hook suspension line was a nylon cord, and the hook was a second neodymium magnet. When the first neodymium magnet and steel part of the magnetic coupling were optimally attached, the attractive magnetic force between them was less than the maximal net lift of the UAV but greater than the weight of the payload to be retrieved. This was determined empirically by attaching the hook to various weights, applying maximal power (i.e., upward lift) to the UAV, and observing whether the magnetic coupling separated.

The inventive apparatus was deployed to retrieve a child's toy that had accidentally landed on the roof of a building. A portion of the toy was ferromagnetic, which is why a magnetic hook was selected. The building was surrounded by many trees, creating a risk that a UAV and cable lacking the inventive features would have been caught or snagged on a tree. The aerial device was maneuvered over the toy and then lowered such that the second neodymium magnet attached to the toy by magnetic force. The UAV was then maneuvered to lift the toy from the roof and lower it to the ground, where it was retrieved by the UAV operator.

Example 2

An inventive aerial lifting device is made according to the description of Example 1. The device is deployed to retrieve a tool from a roof. After retrieving the tool, the UAV climbs, whereupon a sudden gust of wind causes the tool and hook to become entangled in a nearby oak tree. The operator applies maximum upward thrust (power), whereupon the UAV quickly rises; the connector cable becomes taught, and the coupling parts separate, allowing the UAV to fly free. The UAV lands safely.

An inventive aerial lifting device is made substantially according to the description of Example 1. The magnetic coupling includes a cylindrical neodymium magnet that fits inside a fitted ferromagnetic cup. The aerial lifting device is deployed to retrieve a mail pouch. After retrieving the mail pouch, the UAV climbs and flies horizontally at 60 miles per hour toward its destination. When a bird flies into the UAV's flight path, the UAV's collision avoidance system detects the bird and quickly decelerates to 0 miles per hour. The mail pouch continues to travel in on its own inertia, applying strain to the magnetic coupling. The magnetic coupling does not slide because of the design of the magnetic coupling.

Example 3

An inventive aerial lifting device is made according to the description of Example 1. The device includes a means to detect if the magnetic coupling has separated and, in such cases, to keep the aerial lifting device stationary by downward modulation of rotor thrust inputs. That means is an electrical contact switch that is in the closed position when magnetic coupling is connected and the open position when it is separated. The electrical contact switch is connected by two electrical conductors to the circuitry of the aerial lifting device that modulates rotor thrust inputs.

The aerial lifting device is deployed to retrieve broken tiles from the 200-foot-tall roof of a medieval cathedral. At one point in the operation, the aerial lifting device must maneuver in a tight space between two architectural features, which are gargoyles. The hook at the end of the cable becomes snagged on the claws of one gargoyle. The aerial lifting device operator applies maximal thrust, causing the coupling to separate. The separation of the coupling is automatically detected by the contact switch, and the thrust is automatically reduced to keep the aerial lifting device stationary in the air. Had the thrust not been automatically reduced, the recoil caused by sudden separation of the coupling and the unopposed thrust would have caused the aerial lifting device to crash into the head of the other gargoyle.

Example 4

The follow example describes an aerial lifting system ideal for the safe retrieval of ecological research cameras from abandoned bird's nests in a densely vegetated and windy forest. A large number of research cameras were previously placed in bird nests on tree limbs about 10-20 m above ground. Each camera has a mass of 0.5 kg and comprises a flat steel plate. The cameras were placed in the nests so that the steel plates were oriented upward. An aerial lifting device is needed to retrieve each camera. An aerial lifting system was built. The system comprises (where part numbers refer to FIG. 3): a 4-rotor UAV 101 with a maximal net lift of 30 N, a connector 102 that is a flexible coaxial cable comprising a braided nylon weight-bearing sheath surrounding an electrical cable core, the core comprising two separately insulated braided copper conductors; a magnetic coupling comprising a first coupling part 103 that is a first disc-shaped neodymium magnet 6 mm in diameter and a second coupling part 104 that is a disc-shaped steel plate 10 mm in diameter with a circular central recess that is complementary to the shape of the neodymium magnet, whereby the first neodymium magnet can be substantially recessed into the disc-shaped steel plate;

wherein the holding force between the optimally attached neodymium magnet and disc-shaped steel plate is 8 N; an electrical contact switch 108 attached to the surface of the first coupling part 103 that is closed by contact between the first coupling part 103 and the second coupling part 104, and which closes or opens a sensor circuit on the UAV 101 through the copper conductors; a hook suspension line 107 that is a nylon cord 2 m in length; a hook 105 that is a second disc-shaped neodymium magnet 6 mm in diameter; and a payload 106 (i.e., a camera) weighing 0.5 kg. The aforementioned parts are arranged as shown in FIG. 3.

An operator deploys the system to retrieve a camera. A first camera is retrieved from a first nest by maneuvering the UAV such that the hook comes into proximity with the upward-facing steel plate on the camera, whereupon the camera attaches to the hook. The UAV climbs and pulls the camera aloft. Due to the strong and shifting winds, the payload (camera) swings in the air, but the magnetic coupling does not separate, in part because of the relative shapes and relative fit of the first coupling part and second coupling part. The operator maneuvers the UAV within her reach and detaches the first camera from the hook. The operator then proceeds to maneuver the UAV toward a second nest to attempt to collect a second camera. The hook suspension line, however, becomes snagged on the spiny branch of a tree. The operator applies maximal thrust to the UAV, whereupon the first coupling part separates from the second coupling part. Simultaneous with that separation, the electrical contact switch attached to the first coupling part opens, signaling to the UAV circuitry to reduce thrust to avoid sudden upward recoil of the UAV and unwanted ascent of the UAV into a tree limb above the UAV. An endangered tree frog sitting on that limb is spared.

I claim:

1. An aerial device for lifting a payload, the device comprising:
   a payload;
   a multirotor unmanned aerial vehicle (UAV);
   a magnetic coupling comprising a first coupling part and a second coupling part;
   a switch; and
   two or more conductors connecting the switch to the UAV;
   wherein:
      one of the first coupling part and the second coupling part comprises a first permanent magnet;
      the other of the first coupling part and the second coupling part comprises a ferromagnetic counterpart or a second permanent magnet;
      the first coupling part is configured to releasably attach to the second coupling part by magnetic force;
      the switch is configured to detect separation of the first coupling part from the second coupling part; and
      wherein the UAV is configured to remain stationary in response to the switch detecting separation of the first coupling part from the second coupling part;
   and wherein:
      the first coupling part is attached to the UAV;
      the second coupling part is attached to a hook;
      the hook is configured to attach to the payload; and
      the magnetic force between the first coupling part and the second coupling part is:

less than the maximal net lift of the unmanned aerial vehicle; and greater than the aggregate weight of the payload, the second coupling part, and the hook.

2. The device of claim 1, wherein the switch is an electrical contact switch that is closed when and only when the first coupling part and second coupling part are in contact.

3. The device of claim 2, wherein the switch is connected to the UAV by means of two electrical conductors.

4. The device of claim 3, wherein one of first coupling art and the second coupling part comprises a permanent magnet and the other coupling part comprises a ferromagnetic counterpart.

5. The device of claim 3, wherein each of the first coupling art and the second coupling part comprises a permanent magnet.

6. The device of claim 3, wherein the first coupling part and the second coupling part possess complementary shapes such that, when the first coupling part and the second coupling part are attached, relative movement between the first coupling part and the second coupling part is substantially restricted to an axis of the first permanent magnet.

7. The device of claim 3, wherein the first coupling part is attached to the UAV by means of a connector that is interposed between the UAV and the first coupling part.

8. The device of claim 7, wherein the connector comprises the two electrical conductors.

9. The device of claim 3, wherein the hook is attached to the second coupling part by means of a hook suspension line that is interposed between the second coupling part and the hook.

10. The device of claim 3, wherein the magnetic force is less than 75 percent of the maximal net lift of the unmanned aerial vehicle.

11. The device of claim 3, wherein the magnetic force is less than 50 percent of the maximal net lift of the unmanned aerial vehicle.

12. The device of claim 3, wherein the magnetic force is more than 150 percent of the weight of the payload.

13. The device of claim 3, wherein the magnetic force is more than 200 percent of the weight of the payload.

14. The device of claim 3, wherein the magnetic force is less than 75 percent of the maximal net lift of the unmanned aerial vehicle and more than 150 percent of the weight of the payload.

15. The device of claim 3, wherein the magnetic force is less than 75 percent of the maximal net lift of the unmanned aerial vehicle and more than 200 percent of the weight of the payload.

16. The device of claim 3, wherein the magnetic force is less than 50 percent of the maximal net lift of the unmanned aerial vehicle and more than 150 percent of the weight of the payload.

17. The device of claim 3, wherein the magnetic force is less than 50 percent of the maximal net lift of the unmanned aerial vehicle and more than 200 percent of the weight of the payload.

* * * * *

UNITED STATES PATENT AND TRADEMARK OFFICE
CERTIFICATE OF CORRECTION

PATENT NO. : 11,377,212 B2
APPLICATION NO. : 16/784780
DATED : July 5, 2022
INVENTOR(S) : Samia A. Singer It is certified that error appears in the above-identified patent and that said Letters Patent is hereby corrected as shown below:

In the Claims

In Claim 4, Column 11, Line 11, delete "art" and insert -- part --.

In Claim 5, Column 11, Line 16, delete "art" and insert -- part --.

Signed and Sealed this
Thirtieth Day of August, 2022

Katherine Kelly Vidal
*Director of the United States Patent and Trademark Office*